United States Patent [19]

Tsuchimoto et al.

[11] Patent Number: 5,587,252
[45] Date of Patent: Dec. 24, 1996

[54] PROCESS FOR DISPOSING OF SPENT NAS CELLS

[75] Inventors: Tomonori Tsuchimoto, Hashima-Gun; Katsuichi Iwata, Ichinomiya; Yoshihiko Kurashima, Nagoya, all of Japan

[73] Assignee: NGK Insulators, Ltd., Japan

[21] Appl. No.: 483,160

[22] Filed: Jun. 7, 1995

[30] Foreign Application Priority Data

Jul. 20, 1994 [JP] Japan .................................. 6-167739
Jun. 1, 1995 [JP] Japan .................................. 7-135265

[51] Int. Cl.[6] .................................................. H01M 10/54
[52] U.S. Cl. ................................................ 429/49; 429/104
[58] Field of Search ........................................ 429/49, 104

[56] References Cited

U.S. PATENT DOCUMENTS 5,120,616  6/1992  Bauer ................................. 429/49
5,458,990  10/1995  Ramskopler et al. ............... 429/49

Primary Examiner—M. Nuzzolillo
Attorney, Agent, or Firm—Parkhurst, Wendel & Burr, L.L.P.

[57] ABSTRACT

A process is disclosed for disposing of a spent NaS cell, which process comprises the steps of: cutting an opening in the NaS cell for flowing out sodium from the cell and allowing an inner tube to be pulled out from the NaS cell; placing oil on sodium inside the inner tube of the spent NaS cell in a given thickness, while the cut opening is directed upwardly; setting the spent NaS cell in a workpiece-setting vessel outside a heating oil vessel, while the cut opening is directed downwardly, thereby flowing out the oil on the sodium inside the inner tube, said workpiece-setting vessel being provided at a bottom with a hole for allowing an inner tube to be pulled out from the the spent NaS cell, immersing the spent NaS cell set in the workpiece-setting vessel into oil in the heating oil vessel in the state that the cut opening is directed downwardly; sodium is melted in the oil of the heating oil vessel and flown out therein through the cut opening; and then the inner tube is pulled out from the NaS cell.

9 Claims, 10 Drawing Sheets

FIG._1

FIG._4
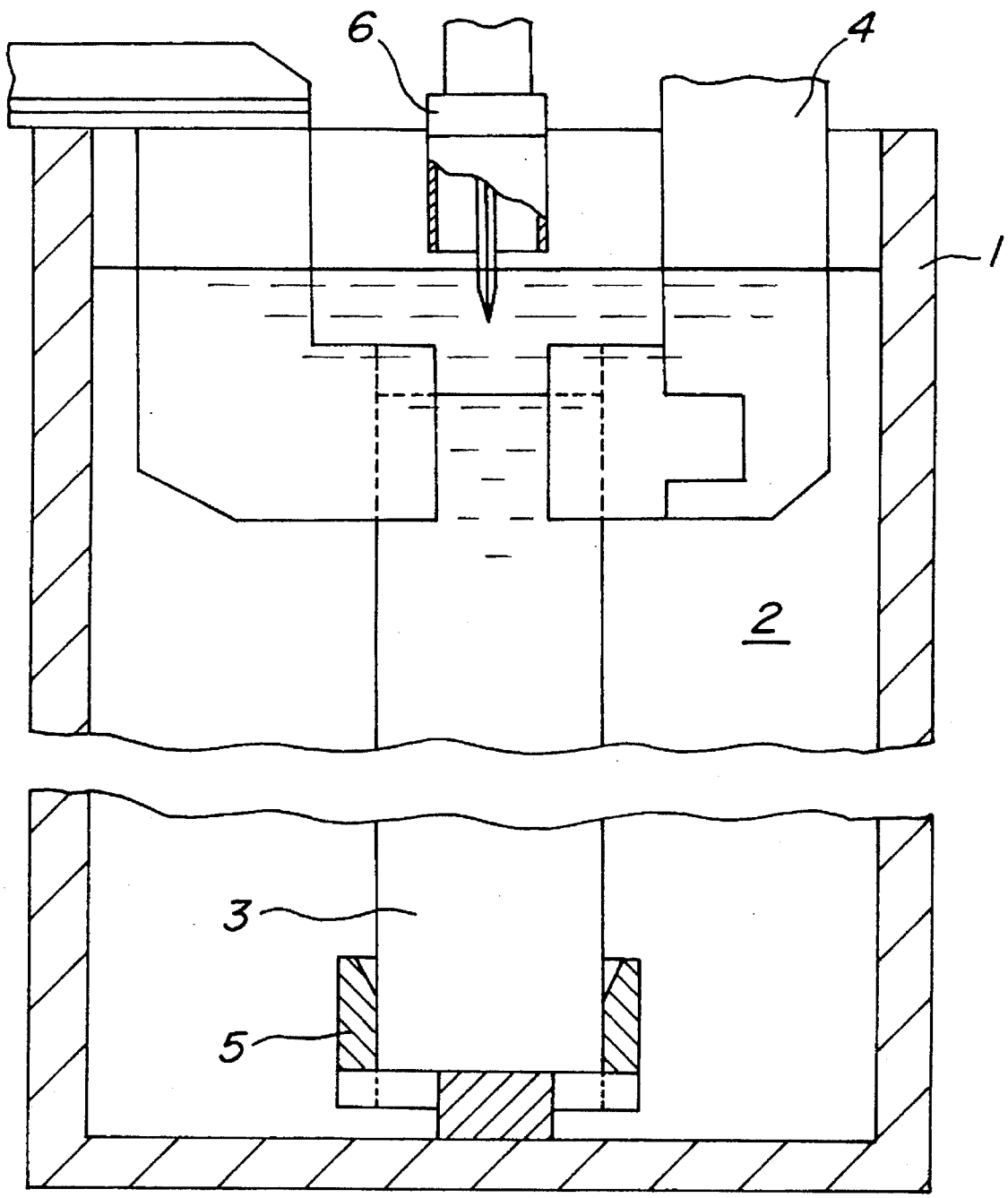

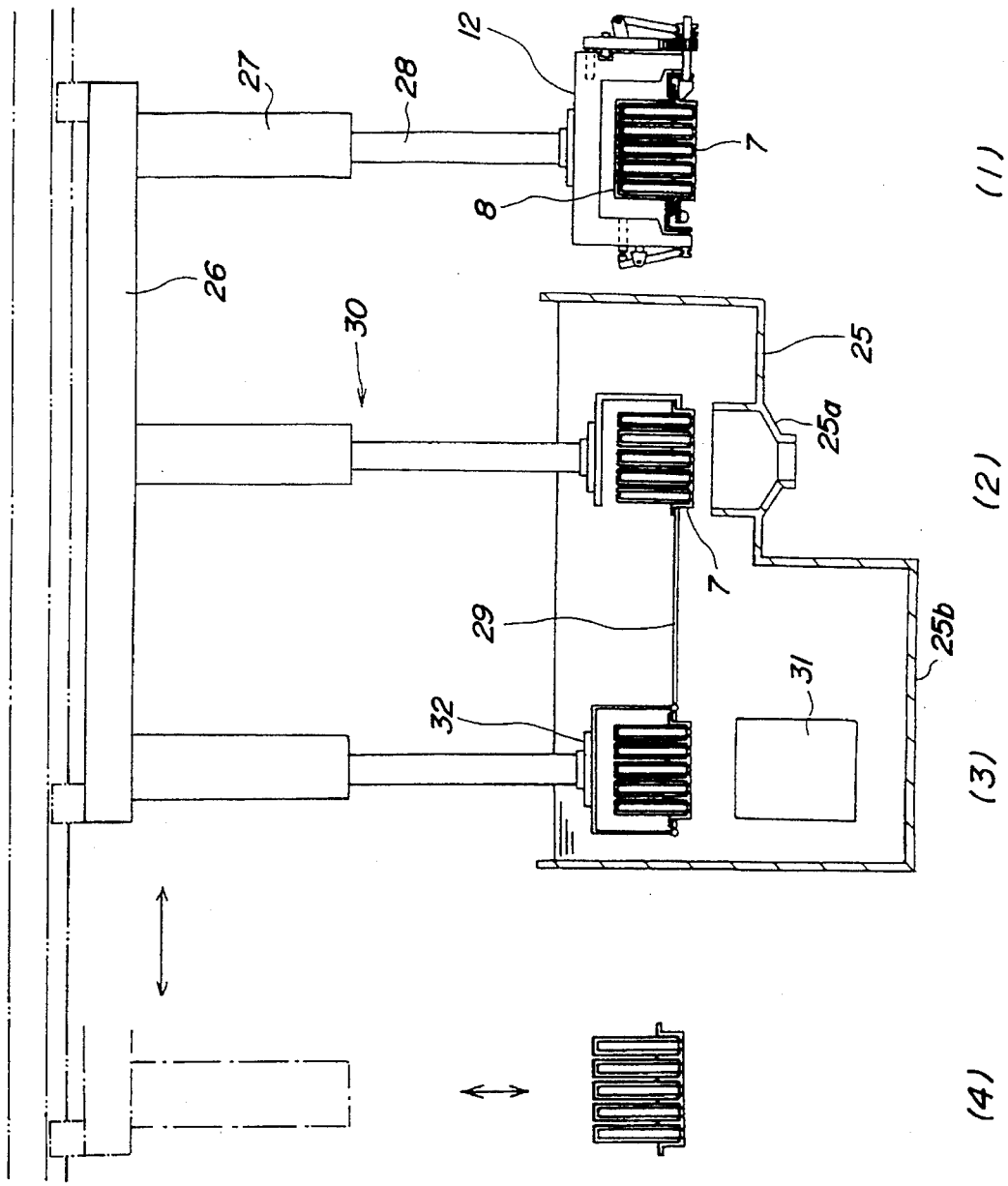

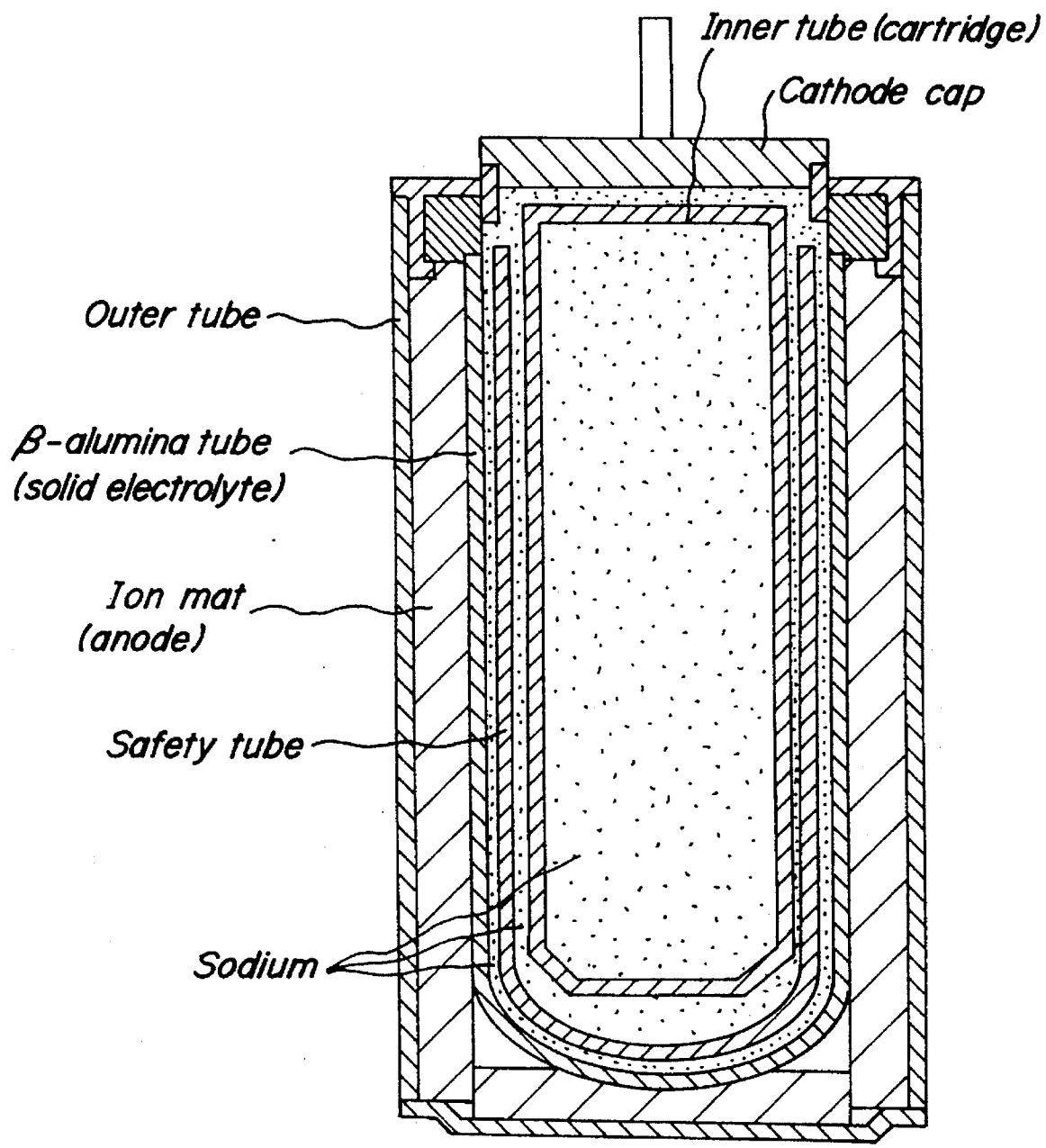
FIG_12

PROCESS FOR DISPOSING OF SPENT NAS CELLS

BACKGROUND OF THE INVENTION (1) Field of the Invention

The present invention relates to a process and an apparatus for disposing of spent NaS cells.

(2) Related Art Statement

The NaS cell is a cell in which sodium and sulfur are placed in opposite sides of an intermediate tube made of a solid electrolyte, respectively. Such NaS cells have been developed as cells for storing a large amount of electric power and as cells for use in electric automobiles. However, since the service life of the NaS cell is considered to be about 10 years, it is anticipated that a huge number of spent NaS cells will come out in the future.

The present inventors have been developing techniques for disposing of spent NaS cells herald of the world. Inventors' past research revealed that in order to recover sodium and sulfur from the interior of the NaS cell, an opening needs to be formed in the NaS cell that has a complicated multi-tubular structure by cutting to recover the sodium. Then, an inner tube needs to be removed from the NaS cell. During the research, it has been revealed that although sodium can flow from the interior of the NaS cell inside an oil vessel in a state such that the cut opening is directed downwardly, the inner tube needs to be pulled out from the NaS cell inside a heating oil vessel filled with a flowing paraffin or the like so as to prevent the sodium from contacting air. Further, it was revealed that when the above opening is cut and formed in the NaS cell inside oil, oxidization of sodium can be effectively prevented. However, even when the inner tube is pulled out after the spent NaS cell having the opening cut is immersed in the oil inside the heating oil vessel in the state that the cut opening is directed downwardly and then sodium is melted and to flow out and into the oil, various problems exist. That is, if the NaS cell is left for a long time, after the formation of the cut opening, in the state that the opening is directed downwardly, sodium inside the inner tube contacts air so that an oxide film is formed at the surface of sodium. Consequently, even if the NaS cell is heated in the heating oil vessel and it is melted, it is difficult for the sodium to flow due to the existence of the oxide film, and it takes a long time to discharge the sodium. It was further revealed that in order to smoothly extract the sodium, it is necessary to remove the oxidization film.

SUMMARY OF THE INVENTION

It is an object of the present invention to solve the above-mentioned conventional problems, and to provide a process and an apparatus for disposing of spent NaS cells, which process and apparatus can effectively prevent oxidation of sodium, and smoothly extract sodium inside oil in a heating oil vessel so that the inner tube of the spent NaS cell may be smoothly pulled out from the spent NaS cell.

According to the process for disposing of the spent NaS cells in a first aspect of the present invention, the process comprises the steps of: cutting an opening in the NaS cell for flow of the sodium and allowing an inner tube to be pulled out from the NaS cell; placing oil on sodium inside the inner tube of the spent NaS cell in a given thickness, while the cut opening is directed upwardly; setting the spent NaS cell in a workpiece-setting vessel outside a heating oil vessel, while the cut opening is directed downwardly, such that the oil on the sodium inside the inner tube flow out, said workpiece-setting vessel being provided at a bottom with a hole for allowing an inner tube to be pulled out from the spent NaS cell; immersing the spent NaS cell set in the workpiece-setting vessel into oil of a heating oil vessel in the state that the cut opening is directed downwardly; sodium is melted in the oil inside the heating oil vessel and flows out through the cut opening; and then the inner tube is pulled out from the NaS cell.

The following are preferred aspects of the spent NaS cell disposal process.

(1) Said cut opening includes a first opening for allowing the inner tube from the spent NaS cell and a second opening for flow of the sodium, the first opening is formed at the spent NaS cell by cutting, and then the second opening is formed at the NaS cell.

(2) The opening of the spent NaS cell is cut in oil of an opening-cutting oil vessel to place oil on sodium inside the inner tube in a given thickness through the cut opening; a lower portion of the spent NaS cell in which the oil is placed on the sodium inside the inner tube is set inside a pressing vessel member arranged outside the opening-cutting oil vessel and the heating oil vessel in the state that cut opening is directed upwardly; said workpiece-setting vessel being provided at the bottom with the hole for allowing the inner tube to be pulled out from the the spent NaS cell is arranged onto the pressing vessel member, thereby accommodating the spent NaS cell between and inside the pressing vessel member and the workpiece-setting vessel; the pressing vessel member, the workpiece-setting vessel and the spent NaS cell are vertically inversed to downwardly direct the cut opening of the cell between the pressing vessel member and the workpiece-setting vessel and permit flow of the oil from inside the inner tube; and the spent NaS cell set between the pressing vessel member and the workpiece-setting vessel is immersed into the oil inside the heating oil vessel.

(3) The pressing vessel member, the workpiece-setting vessel and the spent NaS cell are vertically inversed to downwardly direct the cut opening of the NaS cell between the pressing vessel member and the workpiece-setting vessel and to permit flow of the oil from inside the inner tube; the pressing vessel member is removed; and the spent NaS cell set in the workpiece-setting vessel is immersed into the oil inside the heating oil vessel in the state that the cut opening is directed downwardly.

(4) Immediately before the spent NaS cell is immersed into the oil of the heating oil vessel, the pressing vessel member, the workpiece-setting vessel and the spent NaS cell are vertically inversed to downwardly direct the cut opening of the NaS cell between the pressing vessel member and the workpiece-setting vessel and to permit flow of the oil from inside the inner tube; and the spent NaS cell is set between the pressing vessel member and the workpiece-setting vessel is immersed into the oil inside the heating oil vessel in the state that the cut opening is directed downwardly.

(5) The opening is formed by cutting the spent NaS cell inside the oil in the opening-cutting oil vessel, and the oil is placed on the sodium inside the inner tube inside the opening-cutting oil vessel in a given thickness.

The spent NaS cell disposal apparatus according to the present invention comprises:

① a workpiece-setting vessel having a hole at a bottom portion for allowing an inner tube of a spent NaS cell to be pulled out from the NaS cell, said workpiece-setting vessel adapted to hold and support the spent NaS cell in the state that a cut opening of the NaS cell for flowing of sodium therefrom and pulling out an inner tube from the spent cell is opposed to the hole of the NaS cell;

②  an heating oil vessel into which the spent NaS cell is immersed, sodium inside the inner tube of the cell flows through the cut opening of the NaS cell, and the inner tube is pulled out from the spent NaS cell;

③ a transporting elevator adapted to reciprocate along a reciprocating beam extending above the heating oil vessel and between above the heating oil vessel and outside the heating oil vessel, said transporting elevator being adapted to hold the workpiece-setting vessel at a lower end portion, to be descended from the location above the heating oil vessel and to immerse the NaS cell held by the workpiece-setting vessel into oil inside the heating oil vessel for flow of the sodium therefrom and to take the spent NaS cell out from the heating oil vessel after the inner tube is taken out from the NaS cell; and ④ an extractor for extracting the inner tube of the spent NaS cell after the sodium flow from the NaS cell inside the oil in the heating oil vessel in the state that the cut opening is directed downwardly.

The following are preferred embodiments of the spent NaS cell disposal apparatus according to the present invention.

(1) The spent NaS cell disposal apparatus further comprises a cutter for forming a first opening at the spent NaS cell by cutting, said first opening being adapted to pull out the inner tube from the spent NaS cell, an opening-cutting oil vessel in which the spent NaS cell is immersed in oil and a second opening is formed in the NaS cell by cutting, and a cutter for cutting said second opening in the spent NaS cell in the oil in the opening-cutting oil vessel, said second opening being adapted for flow of the sodium from the cell and to place the oil on the sodium in the spent NaS cell through the first and second openings.

(2) The spent NaS cell disposal apparatus further comprises a pressing vessel member which is to be detachably attached to the workpiece-setting vessel, said pressing vessel member being adapted to hold the spent NaS cell between the workpiece-setting vessel and to enable the cell to be vertically inversed in the state that the spent NaS cell is held between the pressing vessel member and the workpiece-setting vessel.

(3) A rail for supporting the workpiece-setting vessel in which the spent NaS cell is held while the cut opening is directed downwardly, is provided in the heating oil vessel, a location for flow of the sodium from the NaS cell is provided in the heating oil vessel separately from a location for pulling out the inner tube from the spent NaS cell, said rail is extended between the sodium flow location (outlet) and the inner tube pull-out location, and a first carrier is provided to move the spent NaS cell along the rail from the sodium flow location to the inner tube pull-out location.

(4) The spent NaS cell disposal apparatus further comprises a second carrier for moving the pressing vessel member removed from the workpiece-setting vessel, after the vertical inversion, to a location to receive a next spent NaS cell in which the cut opening is formed and oil is placed on sodium inside the inner tube in the state that the cut opening is directed upwardly, and a third carrier for moving the workpiece-setting vessel to a location where the workpiece-setting vessel receives the next spent NaS cell.

(5) The above transporting elevator comprises first through third transporting elevators, said first transporting elevator being adapted to reciprocate along the reciprocating beam extending above the heating oil vessel and between above the heating oil vessel and outside the heating oil vessel, and being adapted to hold the workpiece-setting vessel at a lower end portion, to be descended from the location above the heating oil vessel, and to immerse the NaS cell held by the workpiece-setting vessel into oil in the heating oil vessel for flow of the sodium therefrom, said second transporting elevator being adapted to move the spent NaS cell to the inner tube pull-out location after the sodium is melted and removed from the spent NaS cell, and said third transporting elevator for taking out the remaining spent NaS cell out from the heating oil vessel after the inner tube is pulled out therefrom.

The spent NaS cell generally has a structure as shown in Japanese patent application Laid-open No. 3-88281 by way of example. That is, inside an outer tube are arranged a carbon mat tube (anode), a solid electrolyte tube (β-alumina tube), a safety tube and an inner tube in this order from radially inner to outer sides, and an open end of the solid electrolyte tube is sealed with a cathode cap (See FIG. 12). In such an NaS cell, the cathode cap is formed with an opening for allowing the inner tube to be pulled out from the cell, by appropriate cutting means. Then, an opening for flow of the sodium from the cell is formed in a sealed end portion of the inner tube exposed through the opening of the cathode cap. In order to facilitate the pull-out of the inner tube from the cell through the inner tube pull-out opening, it is preferable that the diameter of the sodium flow-out opening is substantially equal to or slightly smaller than the inner diameter of the inner tube.

According to the spent NaS cell disposal process according to the present invention, after the sodium discharge opening is bored in the spent NaS cell, the surface of sodium inside the inner tube is covered with oil inside the heating oil vessel in the state that the cut opening is directed downwardly, until the cell is immersed into the oil in the heating oil vessel. Therefore, the formation of an oxidized film at the surface of the sodium can be prevented. Although the oil is discharged from the spent NaS cell by vertically inverting the spent NaS cell so that the cut opening may be directed downwardly, the cell is immersed into the oil in the heating oil vessel before the oil film at the surface of the sodium is broken. Consequently, the formation of the oxidized film at the surface of the sodium can be prevented. Further, since the NaS cell is immersed into the heating oil vessel in the state that the cut opening is directed downwardly, air is taken into a space under the sodium inside the inner tube of the cell. Consequently, the air taken into the space is heated and thermally expanded, so that the melted sodium is discharged from the cell in a shorter time.

Further, according to the preferred embodiment of the process of the present invention, since the opening is formed at the upper portion of the spent NaS cell by cutting in the oil inside the oil vessel, oil immediately enters the space over the sodium inside the inner tube. Consequently, the oxidation of the surface of the sodium can be more effectively prevented, so that the sodium can smoothly flow out and be removed.

The spent NaS cell disposal apparatus of the present invention comprises the workpiece-setting vessel, the heating oil vessel, the transporting elevator and the extractor recited in the above ①–④, respectively. Therefore, it is possible to continuously and smoothly discharge the sodium from the spent NaS cell having the cut opening and pull out the inner tube from the outer tube of the cell.

On the other hand, the preferred embodiment (1) of the NaS cell disposal apparatus of the present invention comprises the opening-cutting oil vessel in which the spent NaS cell is immersed and the opening is formed in oil by cutting, and the cutter for cutting the opening in the spent NaS cell inside oil of the opening-cutting oil vessel to enter the space over the sodium inside the inner tube. Thus, since the opening is cut and opened at the upper portion of the spent NaS cell inside the oil of the opening-cutting oil vessel, the oil immediately enters the space over the sodium inside the inner tube through said cut opening. The oxidation of the surface of sodium can be more effectively prevented, and the sodium can smoothly flow out and be removed.

The preferred embodiment (2) of the spent NaS cell disposal apparatus of the present invention further comprises the pressing vessel member which is to be detachably attached to the workpiece-setting vessel, so as to hold the spent NaS cell between the workpiece-setting vessel and enable the cell to be vertically inverted. The pressing vessel member is detachably attached to the workpiece-setting vessel, and can be detached from the workpiece-setting vessel. Therefore, the spent NaS cell held between the pressing vessel member and the workpiece-setting vessel is immersed into the oil of the heating oil vessel, the pressing vessel member can be taken out from the oil vessel, while the workpiece-setting vessel with the spent NaS cell is left in the oil for disposing of the cell. Alternatively, only the workpiece-setting vessel into which the spent NaS cell is placed is immersed in the oil of the heating oil vessel after the pressing vessel member is detached from the workpiece-setting vessel. Consequently, the structure of the disposal apparatus is simplified. In this embodiment, once the spent NaS cell is inserted into the pressing vessel member in the state that the cut opening is directed upwardly and oil is placed on the sodium inside the inner tube, it is possible that the workpiece-setting vessel is placed to cover the pressing vessel member and the spent NaS cell, the assembly of the pressing vessel member, the workpiece-setting vessel and the spent NaS cell are vertically inverted outside the heating oil vessel for flow of the oil on the sodium inside the inner tube, and the cell in the workpiece-setting vessel is immersed into the oil of the heating oil vessel. Therefore, the spent NaS cell can be stored without causing oxidation of sodium in the state that oil is placed on the sodium inside the inner tube of the cell, while the cut opening is directed upwardly. Further, the spent NaS cell in the state that the cut opening is directed upwardly can be vertically inverted, while being assuredly held.

The preferred embodiment (3) of the spent NaS cell disposal apparatus according to the present invention comprises a rail for supporting the workpiece-setting vessel in which the NaS cell is held while the cut opening is directed downwardly, is provided in the heating oil vessel, the location for flowing down the sodium is provided apart from the location for pulling out the inner tube from the NaS cell, said rail is extended between the sodium flow location and the inner tube pull-out location, and the first carrier is provided to move the spent NaS cell along the rail from the sodium flow location to the inner tube pull-out location. Therefore, the spent NaS cells can be simultaneously treated in the sodium flow location and the inner tube pull-out location. Thus, the spent NaS cells can be more efficiently disposed.

The above preferred embodiment (4) of the spent NaS cell disposal apparatus according to the present invention further comprises the second carrier for moving the pressing vessel member removed from the workpiece-setting vessel, after the vertical inversion, to a location to receive the spent NaS cell in which the cut opening is formed and oil is placed on sodium inside the inner tube in the state that the cut opening is directed upwardly, and the third carrier for moving the workpiece-setting vessel, after removing the remaining portion of the NaS cell from the workpiece-setting vessel, to a location where the workpiece-setting vessel receives the next spent NaS cell. Therefore, the spent NaS cells can be continuously disposed of in a circulatory fashion.

According to the preferred embodiment (5) of the spent NaS cell disposal apparatus of the present invention, the above transporting elevator comprises the first through third transporting elevators, said first transporting elevator being adapted to reciprocate along the reciprocating beam extending above the heating oil vessel and between above the heating oil vessel and outside the heating oil vessel, and adapted to hold the workpiece-setting vessel at a lower end portion, to be descended from the location above the heating oil vessel and to immerse the NaS cell held by the workpiece-setting vessel into oil of the heating oil vessel for flow of the sodium, the second transporting elevator being adapted to move the NaS cell to the inner tube pull-out position after the sodium is melted and removed, and the third transporting elevator for taking out the spent NaS cell out from the heating oil vessel after the inner tube is pulled out. Therefore, the spent NaS cells can be smoothly and continuously disposed of along a given line.

In the above, the process and the apparatus for disposing of the spent NaS cell according to the present invention has been described with respect to a single spent NaS cell. However, a plurality of the spent NaS cells can be disposed of in a lump according to present invention as mentioned later.

These and other objects, features and advantages of the invention will be appreciated upon reading of the following description of the invention when taken in conjunction with the attached drawings, with the understanding that some modifications, variations and changes of the same could be easily made by the skilled person in the art to which the invention pertains.

BRIEF DESCRIPTION OF THE DRAWINGS

For a better understanding of the invention reference is made to the attached drawings, wherein

FIG. 4 is a schematic view for illustrating an opening-cutting oil vessel and a cutter used in the process and the apparatus for disposing of the spent NaS cell according to the present invention;

FIG. 6 is a schematic view for illustrating a part of the embodiment of FIG. 1 for the process and the apparatus for disposing of the spent NaS cell according to the present invention in more detail;

FIG. 12 is a sectional view for illustrating the structure of an NaS cell by way of example.

DETAILED DESCRIPTION OF THE INVENTION

Figure 1:
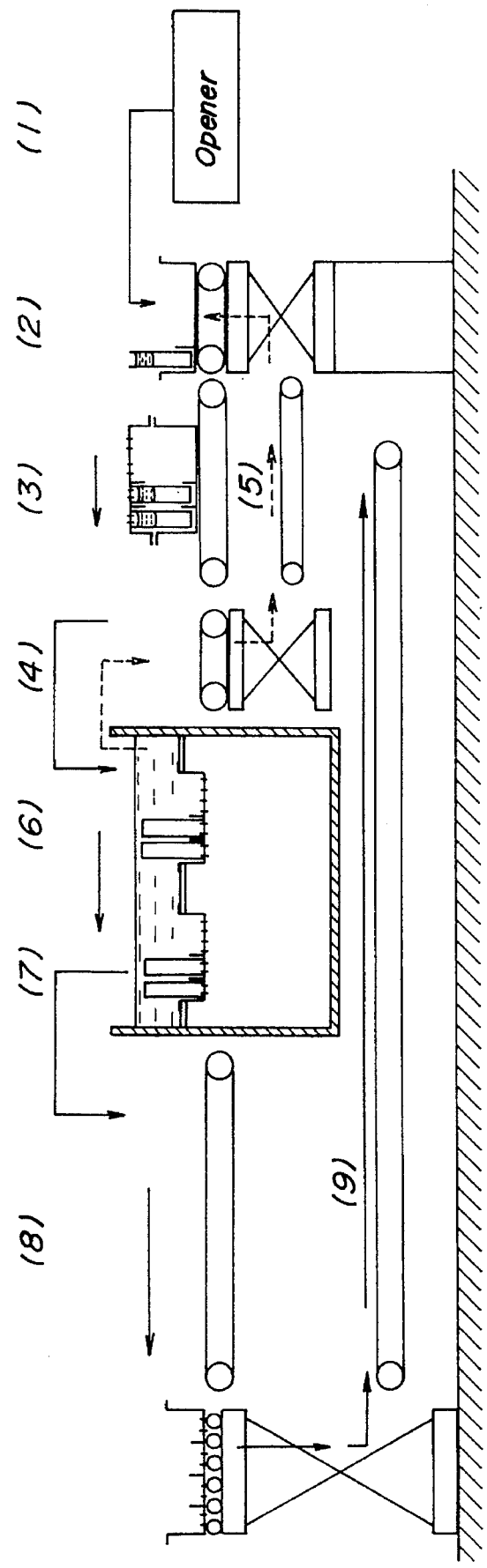
FIG. 1 is a schematic view for illustrating an embodiment of the process and the apparatus for disposing of the spent NaS cell according to the present invention.

In the following, the process for disposing of the spent NaS cells according to the present invention will be explained in more detail.

The NaS cell generally is closed at one end with the other sealed, and sodium and sulfur are sealed in opposite sides of a partition made of an electrolyte, respectively. According to the invention process for disposing of the spent NaS cell, an opening for flowing the sodium from the spent NaS cell and allowing an inner tube to be pulled out from the cell is formed in the spent NaS cell by cutting, and a given amount of oil is poured onto sodium inside an inner tube through the cut opening directed upwardly. At that time, the above cut opening is preferably constituted by a first opening for allowing the inner tube from the cell and a second opening for flow of the sodium from the cell. In this case, the first opening is formed in the cathode cap by cutting, and the second opening for flowing out the sodium from the spent NaS cell is formed by cutting inside oil of an opening-cutting oil vessel to flow oil onto the sodium inside the inner tube in a given thickness. By so doing, sodium is prevented from contacting air, so that the formation of an oxidized film at the surface of sodium can be prevented. Thereafter, the spent NaS cell is set in a workpiece-setting vessel having a hole for allowing the inner tube to be pulled out from the cell, in the state that the above cut opening of the cell is directed downwardly for flow of the oil from the cell. Alternatively, it may be that once the cell is set inside a pressing vessel member in the state that the cut opening is directed upwardly, the workpiece-setting vessel having the hole for pulling out the inner tube is arranged to cover the pressing vessel member and to hold the spent NaS cell therebetween, and then the pressing vessel member, the workpiece-setting vessel and the spent NaS cell are vertically inverted to hold the cell inside the workpiece-setting vessel in the state that the cut opening is directed downwardly for flow of the oil on the sodium inside the inner tube. At that time, before the assembly of the workpiece-setting vessel, the pressing vessel member and the spent NaS cell is immersed, the pressing vessel member placed upwardly by inverting may be removed. After the oil flows out through the downwardly directed cut opening of the cell, the spent NaS cell set in the workpiece-setting vessel is immersed into heated oil, such as flowing paraffin, filled in a heating oil vessel, while the cut opening is kept directed downwardly. Then, the sodium inside the cell is melted and flows down in the oil of the heating oil vessel through the downwardly directed cut opening of the cell and the inner tube-removing hole of the workpiece-setting vessel. Thereafter, the inner tube is pulled out from an outer tube of the spent NaS cell in the oil of the oil heating vessel. The remaining cell is then pulled out from the oil of the heating oil vessel.

In the above, the disposal of a single spent NaS cell per one process is explained. It may be that a plurality of holes for pulling out the inner tubes of the cells are provided in the workpiece-setting vessel, and a plurality of the spent NaS cells are disposed of together.

Next, the spent NaS cell disposal process and the apparatus for effecting the above disposal process according to the present invention will be explained by using schematic views illustrated in FIGS. 1 through 3.

In a first embodiment of FIG. 1, an opening is formed in a spent NaS cell by cutting, so that oil is poured onto sodium inside an inner tube [See FIG. 1(1)]. As an opener, an opener illustrated in FIG. 4 may be used, which will be explained later. In this case, the first opening for allowing the inner tube to be pulled out from the cell is formed in the cathode cap by a cutter not shown, and then the second opening for flow of the sodium from the cell is formed by the opener. Next, a plurality of such spent NaS cells are manually or automatically inserted into respective locations of a pressing vessel member placed on a conveyor such that the cut openings of the spent NaS cells are directed upwardly [See FIG. 1(2)]. Then, the pressing vessel member into which the plural spent NaS cells are inserted is moved onto a succeeding conveyor, and a workpiece-setting vessel having holes for pulling out inner tubes from the spent NaS cells, respectively, is placed to cover the pressing vessel member. Thereby, the spent NaS cells are fixedly held between the pressing vessel member and the workpiece-setting vessel in the state that the cut openings of the cells face the respective inner tube pull-out holes of the workpiece-setting vessel [FIG. 1(3)]. Next, the pressing vessel member and the workpiece-setting vessel are vertically inverted together with the spent NaS cells by using an inverter provided at a transporting elevator not shown, so that the cells are held inside the workpiece-setting vessel and the pressing vessel member in the state that cut openings are directed downwardly. Thereby, the oil inside the cells flows out [FIG. 1(4)]. On the other hand, the spent NaS cells held between the workpiece-setting vessel are immersed into oil in a heating oil vessel by means of the transporting elevator, and the workpiece-setting vessel is placed on rails [See FIG. 1(6)]. The pressing vessel member located upwardly by the above inversing is taken out from the heating oil vessel and returned to the conveyor in the step (2) through a further succeeding conveyor. After the melted sodium is flown down from the spent NaS cells in oil of the heating oil vessel, the workpiece-setting vessel into which the spent NaS cells are inserted is moved to a location for pulling out the inner tubes from the cells, and the inner tubes are pulled out from the cells there [See FIG. 1(7)]. The workpiece-setting vessel in which the spent NaS cells having the inner tubes pulled out are placed is moved onto a succeeding conveyor [FIG. 1(8)], and then returned, by a further conveyor, to a position in the step (3) for using it again [See FIG. 1(9)]. In FIGS. 1(2), (4) and (9), the pressing vessel member and/or the workpiece-setting vessel is moved up and down by using an up-and-down means.

Figure 2:
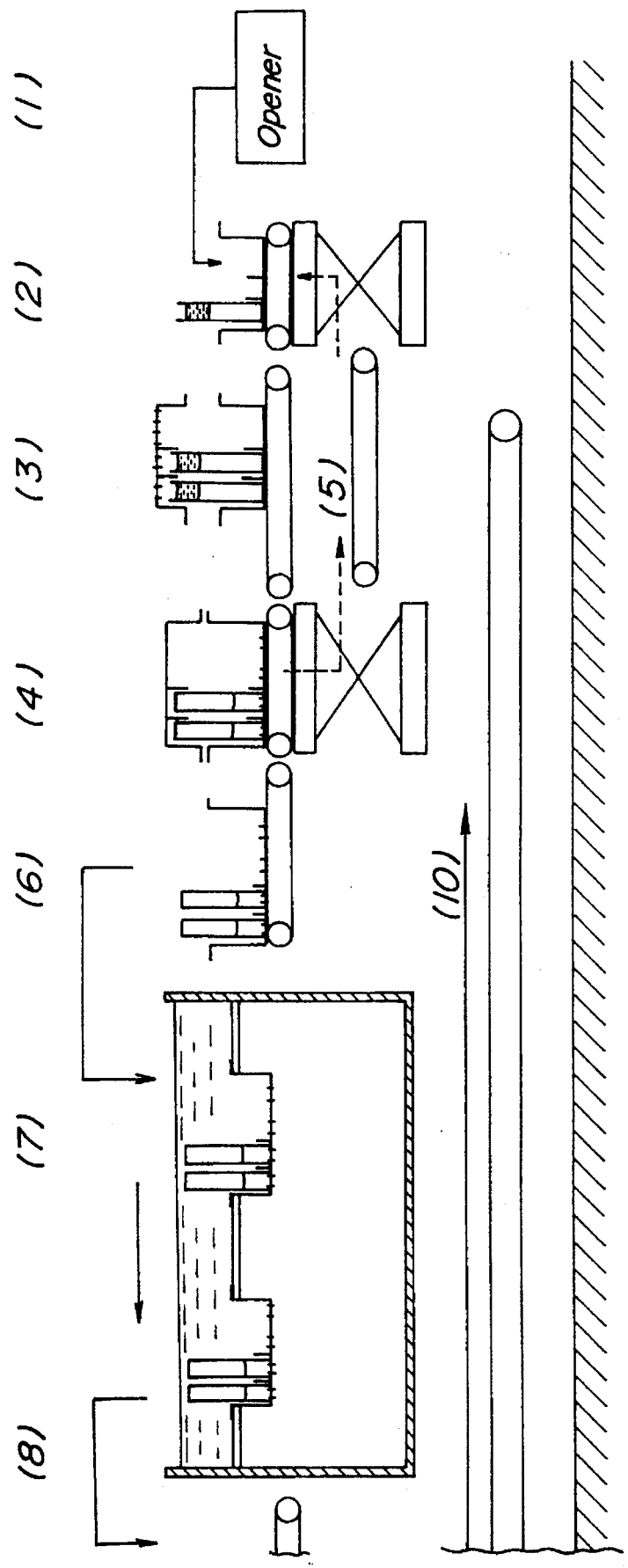
FIG. 2 is a schematic view for illustrating another embodiment of the process and the apparatus for disposing of the spent NaS cell according to the present invention.

In an embodiment illustrated in FIG. 2, the pressing vessel member and the workpiece-setting vessel are vertically inverted together with the NaS cells by using an appropriate inverter in step (4) so that the cut openings of the cells may be directed downwardly in the workpiece-setting vessel in the state the cut opening and faced with the tube pull-out holes of the workpiece-setting vessel. Consequently, oil flows from the cells through the cut openings and the inner tube pull-out holes. FIG. 2 shows a process and an apparatus substantially identical with those in FIG. 1 except that the pressing vessel member is returned to the position at (2) through (5), and the workpiece-setting vessel and the spent NaS cells are immersed into the oil inside the heating oil vessel by using a transporting elevator not shown [the step (6) of FIG. 2]. In FIG. 2, a part of the steps (8) and (9) of FIG. 1 is omitted.

Figure 3:
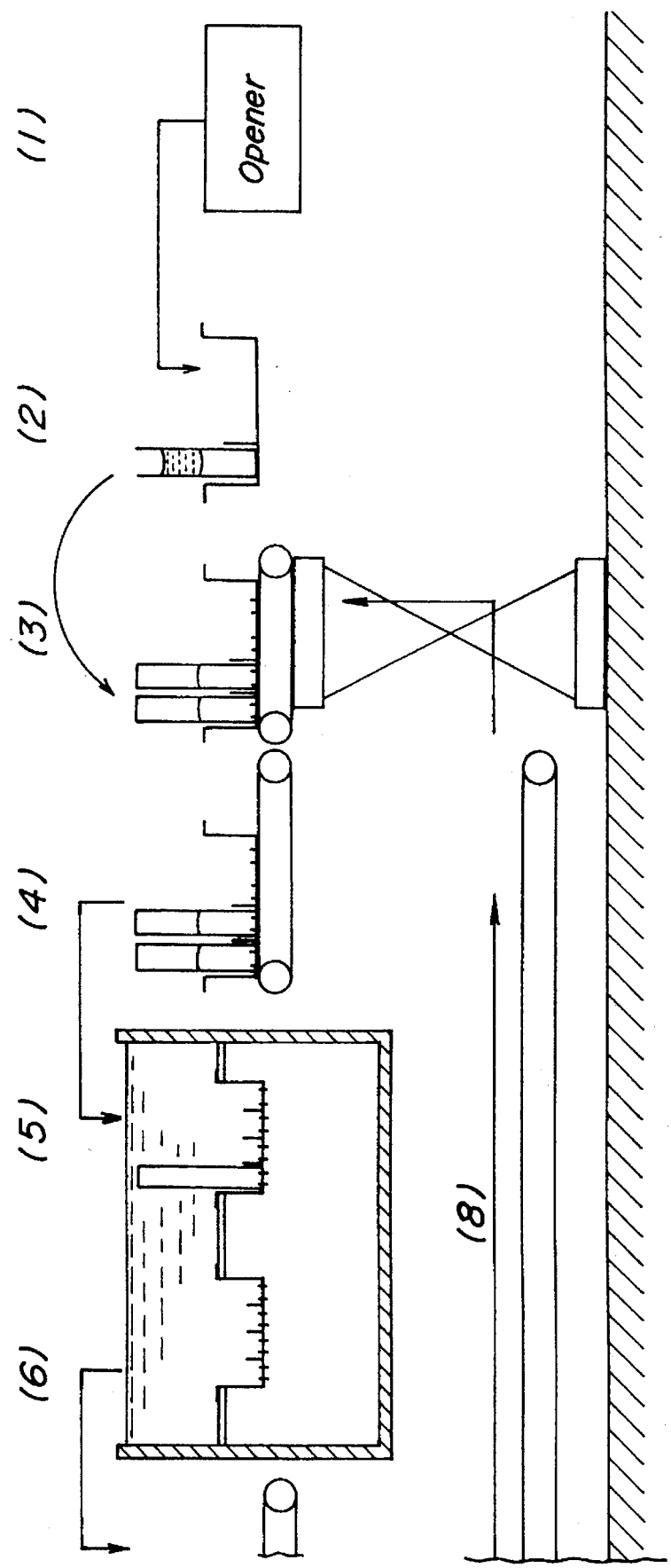
FIG. 3 is a schematic view for illustrating a further embodiment of the process and the apparatus for disposing of the spent NaS cell according to the present invention.

In an embodiment of FIG. 3, spent NaS cells having cut openings are once inserted into an appropriate vessel in step (2), and whether cut pieces are present at the cut openings or not is checked there. After any such cut pieces are removed if necessary, the cells are held in the workpiece-setting vessel having inner tube pull-out holes and placed on a conveyor in step (3) in the state that the cut openings are directed downwardly and face-to-face with the inner tube pull-out holes of the workpiece-setting vessel. Thereby, the oil in the cells flows out. Then, the workpiece-setting vessel into which the cells are inserted is moved onto a succeeding conveyor so as to move the workpiece-setting vessel at a location for transporting the cells into the heating oil vessel. In step (5), the workpiece-setting vessel and the spent NaS cells are immersed into oil in the heating oil vessel by using a transporting elevator not shown. With respect to the other features, FIG. 3 shows a process and an apparatus substantially identical with those in FIG. 1. Since no inversion step as in FIGS. 1 and 2 is necessary in the embodiment of FIG. 3, the process and the apparatus can be further simplified.

According to the present invention, the oil placed on the sodium inside the inner tube and the oil inside the opening-cutting oil vessel may be identical with oil such as flowing paraffin filled in the heating oil vessel. Alternatively, a different oil may be used for the former so long as it does not cause any trouble with the oil in the heating oil vessel.

FIG. 4 schematically shows an opener which may be used in the present invention for cutting an opening in the spent NaS cell for pulling out the inner tube from the cell. In FIG. 4, oil 2 such as flowing paraffin is filled in an opening-cutting oil vessel 1. The spent NaS cell having the inner tube pull-out opening formed in the cathode cap is grasped by a chuck 4 at an upper outer peripheral end portion thereof, and the entire cell 3 grasped by the chuck 4 is immersed into the oil 2 by means of an elevator not shown. The lower outer peripheral end portion of the spent NaS cell 3 immersed is held by a holder 5 provided at a bottom portion of the oil vessel 1. A cutter 6, such as hole saw, freely moving up and down, is arranged coaxially with the axis of the spent NaS cell held vertically in the oil. After the axis of the cutter is aligned with that of the cell 3, the cutter 6 is descended so that an opening having an inner diameter substantially equal to or larger than that of the inner tube is formed by cutting. Since the entire cell is immersed in the oil 2, oil is poured onto sodium inside the inner tube of the cell. For simplification of explanation, the first opening and the second opening are totally referred to as "(cut) opening" hereinunder. Thereafter, the the cutter 6 is raised, and the chuck 4 with the cell 3 is then raised. After excess oil is removed, the cell 3 is moved sidewise together with the chuck 4, and inserted into the pressing vessel member, the workpiece-setting vessel or the cut piece-checking vessel shown in (2) in FIGS. 1 to 3. The cell having the opening formed is pulled up from the oil 2 in the oil vessel 1, and inserted into the pressing vessel member, the workpiece-setting vessel or the cut piece-checking vessel by using an appropriate means instead of the chuck 4.

In the following, the spent NaS cell disposal apparatus to be used in the invention process for disposing of such spent cells will be explained in more detail with reference to an embodiment illustrated in FIGS. 5 to 10.

Figure 5A:
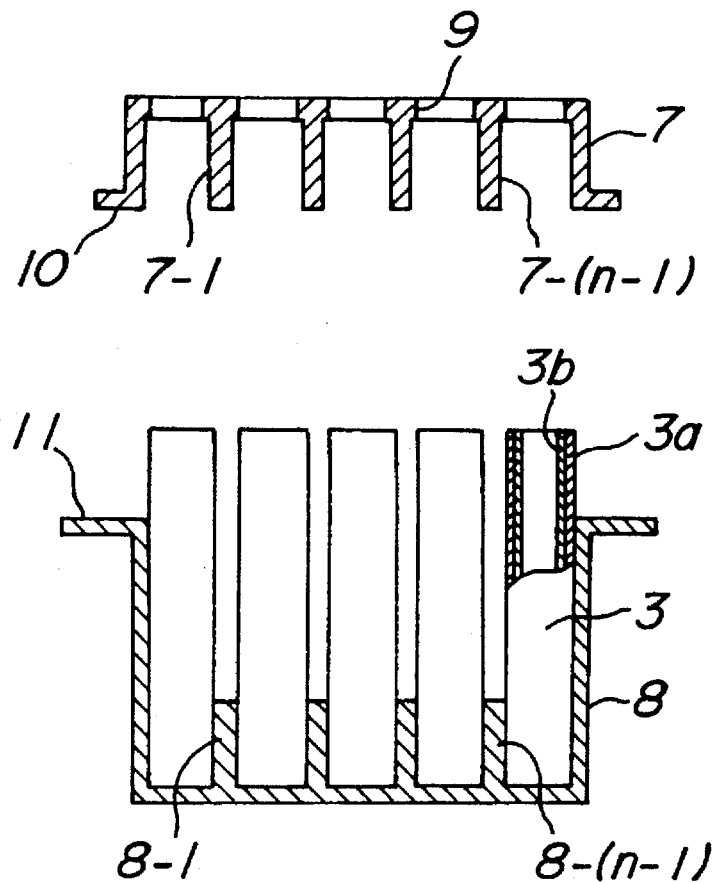
FIGS. 5(a) and (b) are schematic views for illustrating a workpiece-setting vessel and a pressing vessel member to be used for the process and the apparatus for disposing of the spent NaS cell according to the present invention.
Figure 5B:
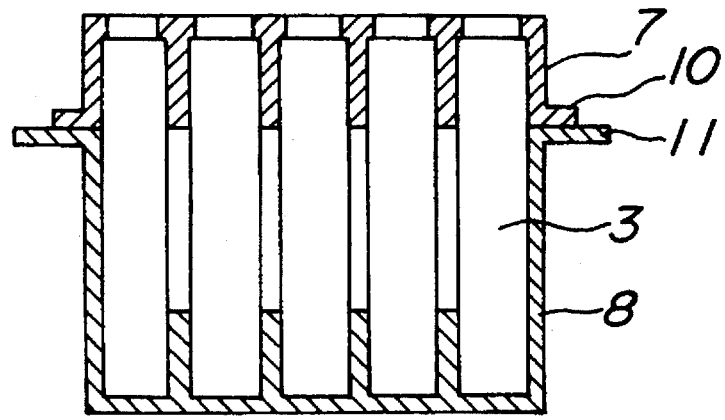

FIG. 5(a) shows a shallow tray-shaped workpiece-setting vessel 7 and a deep tray-shaped pressing vessel member 8. Inside the workpiece-setting vessel 7 and the pressing vessel member 8 are provided partitions 7-1, . . . , 7-(n–1), and partitions 8-1, . . . , 8-(n–1), respectively, for receiving "n" of the spent NaS cells. A hole 9 for pulling out the inner tube from the spent NaS cell is provided in a bottom portion of each of partitioned chambers defined by the partitions in the workpiece-setting vessel 7. Since the spent NaS cell has a complicated multi-tubular structure, only an outer tube 3a and an inner tube 3b are shown in FIG. 5(a) in a simplified manner. The diameter of the inner tube pull-out hole 9 is set greater than the outer diameter of the inner tube 3b of the spent NaS cell but smaller than the inner diameter of the outer tube 3a, so that the inner tube may be pulled out from the cell through the hole 9. The number "n" of the spent NaS cells can be simultaneously handled by using the the workpiece-setting vessel 7 and the pressing vessel member 8 thus constructed. A flange 10 is provided at an open end of the workpiece-setting vessel 7, and a flange 11 is provided at an open end of the pressing vessel member 8. After the spent NaS cells are placed between the workpiece-setting vessel 7 and the pressing vessel member 8, the spent NaS cells are vertically and laterally fixedly held inside between the workpiece-setting vessel member 7 and the pressing vessel member 8 by fixedly butting the flange 10 of the workpiece-setting vessel 7 and the flange 11 of the pressing vessel member 8 [See FIG. 5(b)]. The pressing vessel member 8 functions to receive the cells 3, and prevent the cells from falling when the upper faces of the cells 3 are covered with the workpiece-setting vessel 7 and the entire assembly is vertically inverted. So long as this function is satisfied, its structure is fundamentally arbitrary. The outer diameter of the flange 11 is made greater than that of the flange 10, so that only the pressing vessel member 8 can be pulled up through engagement between the flange 11 of the pressing vessel member and chuck pawl as explained in connection with FIG. 10.

In the process and the apparatus shown in FIGS. 1 and 2, the workpiece setting vessel 7 and the pressing vessel member 8 are used. In the process and the apparatus shown in FIG. 3, only the workpiece-setting vessel 7 is used.

FIG. 6 shows in detail the embodiment shown in FIG. 1, more specifically the inverting step (1) [corresponding to (4) in FIG. 1], the immersion/sodium flow-out step (2) [corresponding to (6) in FIG. 1], the inner tube pull-out step (3) [corresponding to (7) in FIG. 1], and the take-out step (4) [corresponding to (8) in FIG. 1]. FIG. 6(1) shows an inverted state in which the upper workpiece-setting vessel 7 and the lower pressing vessel member 8, which are chucked together at the flanges 10, 11 to fixedly held the cells between them in the state that the openings of the spent NaS cells are directed upwardly, are vertically reversed.

Figure 7:
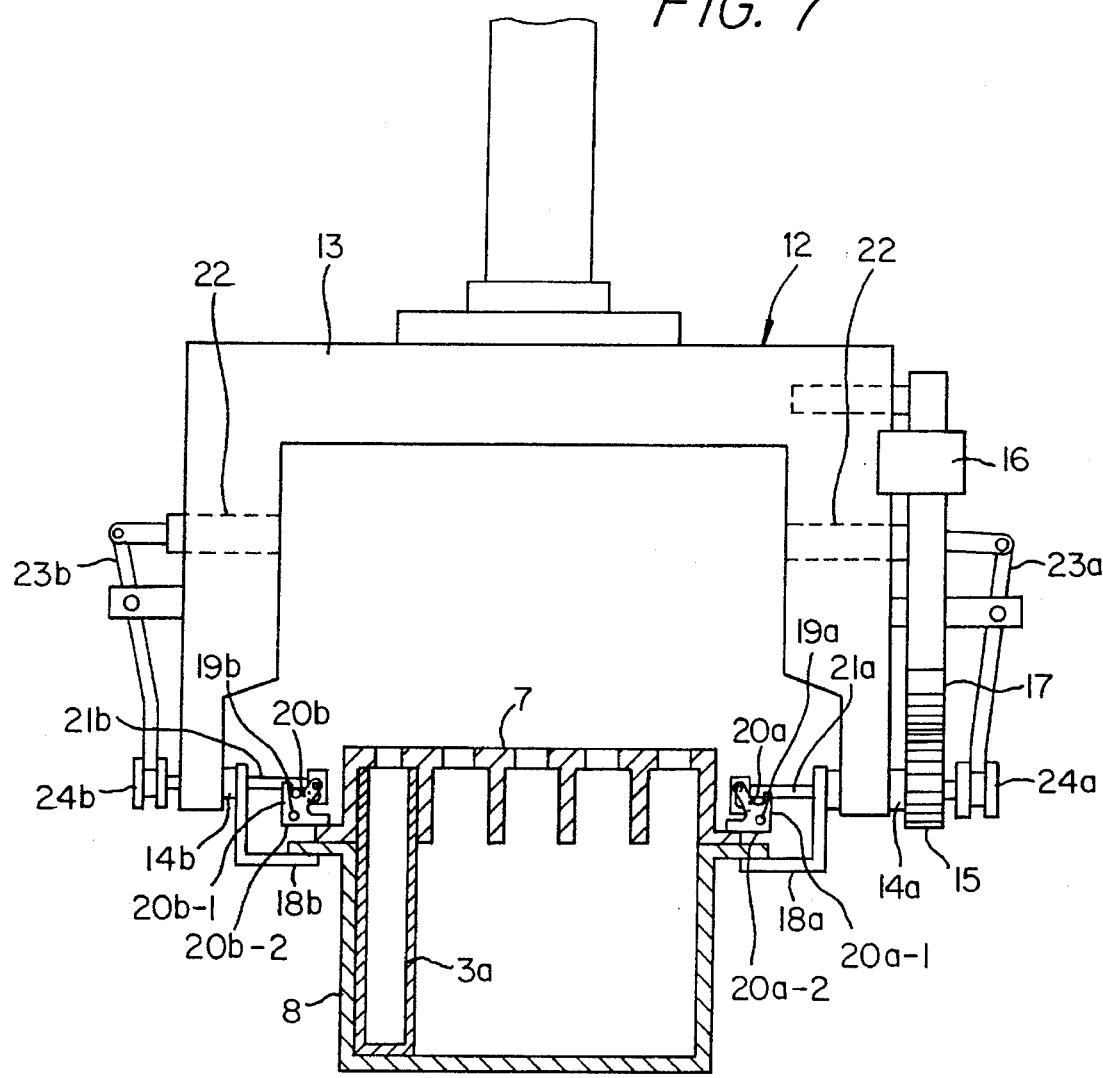
FIG. 7 is a schematic view for illustrating a holding head to be used in the embodiment of FIGS. 1 and 6 for the process and the apparatus for disposing of the spent NaS cell according to the present invention.
Figure 8:
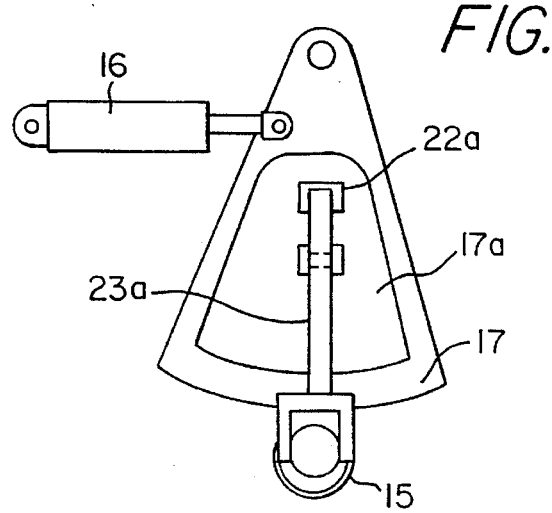
FIG. 8 is a schematic view for illustrating a sector gear of the holding head.

FIG. 7 shows a state in which the upper workpiece-setting vessel 7 and the lower pressing vessel member 8 are chucked together at the flanges 10, 11 by means of the holding head 12 to fixedly hold the spent NaS cells, in the state that the cut openings of the cells are directed upwardly. As shown in FIG. 7, the holding head 12 has a gate-shaped frame 13 defining such a space as to receive the workpiece-setting vessel 7 and the pressing vessel member 8 butted and chucked together and to vertically invert them. Rotary shafts 14a, 14b are journaled at lower ends of opposite legs of the frame 13, respectively. The rotary shaft 14a located on the right side of FIG. 7 is a driving shaft provided with a gear 15, and the other rotary shaft 14b located on the left side is a follower shaft. The gear 15 meshes with a sector gear 17 driven by a cylinder 16, and is rotated by the sector gear 17. The right rotary shaft 14a is thereby rotated at least by 180°, so that the workpiece-setting vessel 7 and/or the pressing vessel member 8 are vertically inverted.

L-shaped chuck pawls 18a, 18b are provided at tips of the rotary shafts 14a, 14b, respectively, and movable chuck pawls 20a, 20b, which are turnable around shafts 19a, 19b, respectively, are opposed to the chuck pawls, respectively. The flange 10 of the workpiece-setting vessel 7 and the flange 11 of the pressing vessel member 8 are chucked together between the chuck pawls 18a, 20a and between the chuck pawls 18b, 20b, respectively, by turning the chuck pawls 20a, 20b. As shown in FIG. 7, the movable chuck pawls 20a, 20b are connected to tips of push rods 21a, 21b in the form of a cross slider crank so that the push rods 21a, 21b may be inwardly or outwardly pushed to turn the chuck pawls 20a, 20b. When the push rods 21a, 21b are inwardly pushed, the chuck pawls 20a, 20b are turned to press chucking faces 20a-1 and 20b-1 against the flange 10 of the workpiece-setting vessel 7 so that the movable chucks 20a, 20b may be downwardly pressed to press the flange 11 of the pressing vessel member 8 against the flange 10 of the workpiece-setting vessel 7.

Figure 10:
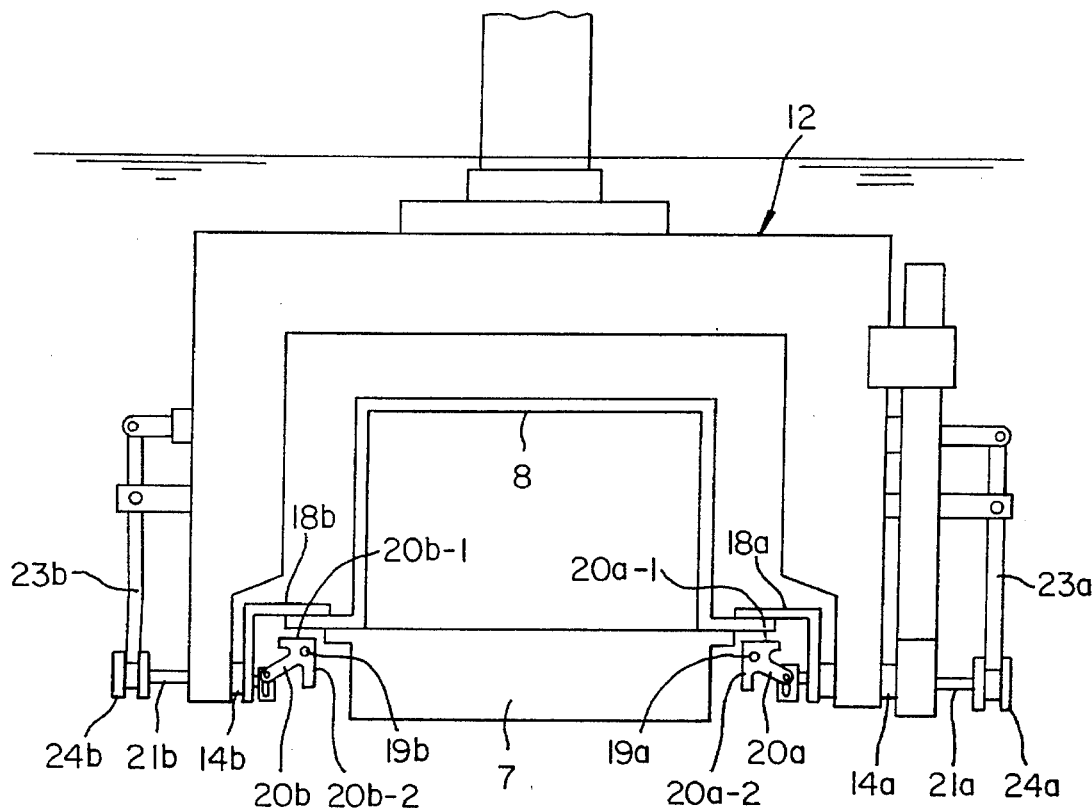
FIG. 10 is a view for illustrating a state in which the workpiece-setting vessel with the spent NaS cells is placed on rails and the chucking state of the holding head is released.

Small-size cylinders 22a, 22b are provided in the legs of the gate-shaped frame 13, and turnable levers 23a, 23b are connected to tips of rods of the cylinders 22a, 22b at one upper end, and to engage with double jaw pin units 24a, 24b at the outer end portions of the push rods at the the other lower ends, respectively. Thereby, the levers 23a, 23b are swingable around their respective supports at the center portions thereof. Therefore, when the upper ends of the levers 23a, 23b are outwardly pushed by the cylinders 22a, 22b, the lower end portions of the levers 23a, 23b inwardly push the push rods 21a, 21b, respectively. To the contrary, when the rods are retracted into the cylinders 22a, 22b, respectively, the upper ends of the levers 23a, 23b are inwardly moved to displace the push rods 21a, 21b outwardly. In this case, the movable chuck pawls are turned as shown in FIG. 10. The sector gear 17 is provided with a large through-hole 17a as shown in FIG. 10, which allows the lever 23a to be turned irrespective of the rotation of the sector gear.

In FIG. 7, the sector gear 17 is turned by the cylinder 16 to turn the rotary shaft 14a via the gear 15 at 180°. At that time, the chuck pawl 18a and the movable chuck pawl 20a are turned. On the other hand, the rotary shaft 14b is correspondingly turned via the flanges 10, 11 of the workpiece-setting vessel 7 and the pressing vessel member 8, the chuck pawl 18b and the movable chuck pawl 20b. Following this, the workpiece-setting piece 7 and the pressing vessel member 8 between which the spent NaS cells 3 are set are vertically inverted to direct the cut openings of the spent NaS cells downwardly (See FIGS. 6 and 9). Since the spent NaS cells are fixedly held between the workpiece-setting vessel 7 and the pressing vessel member 8, the cells do not fall during the above vertical inversion. The oil placed on the sodium inside the inner tubes of the spent NaS cells flows down through the downwardly directed cut openings.

Figure 9:
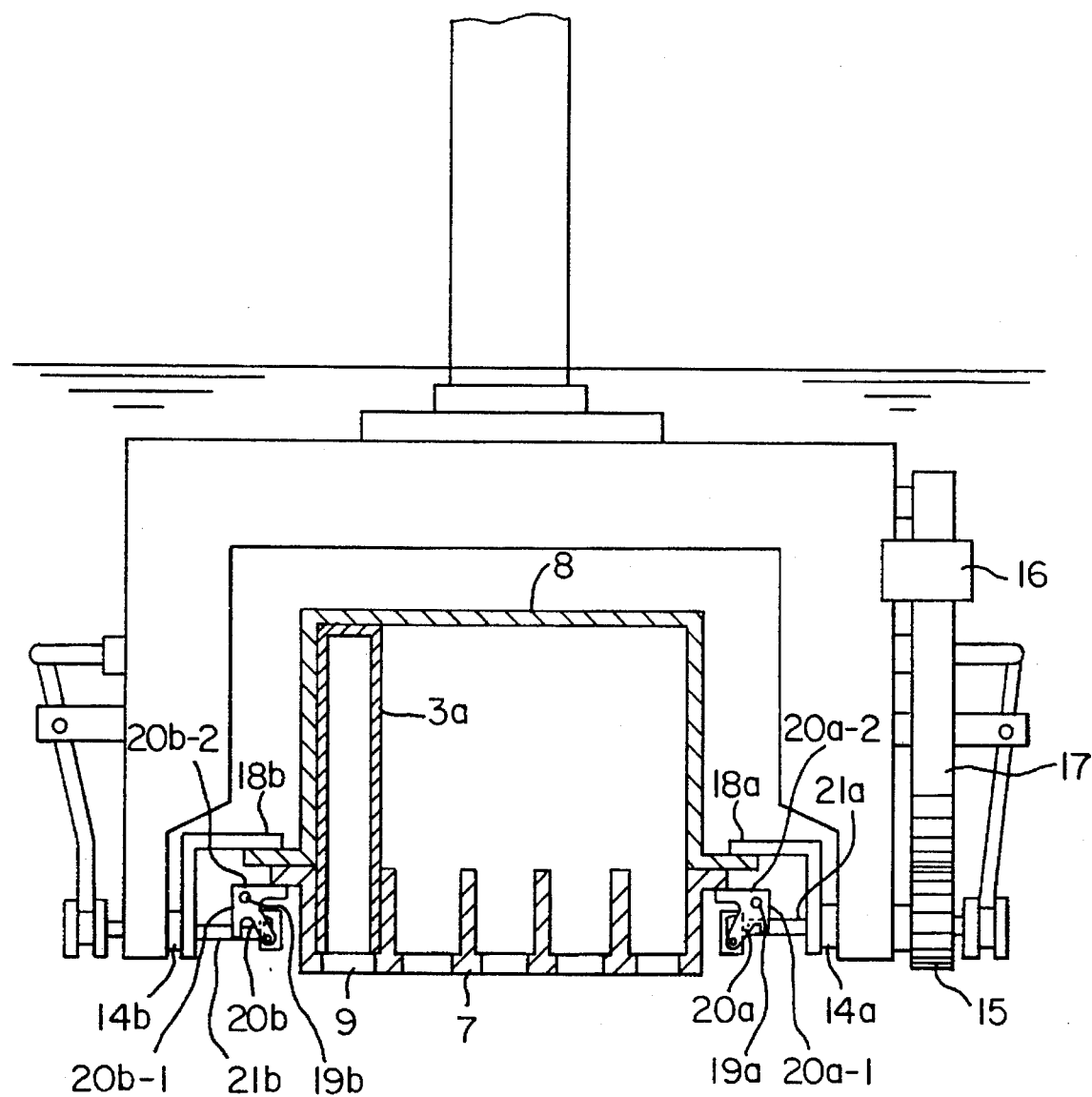
FIG. 9 is a schematic view for illustrating a state in which the holding head having the spent NaS cells are fixedly held between the workpiece-setting vessel and the holding member is immersed into an heating oil vessel.
Figure 11A:
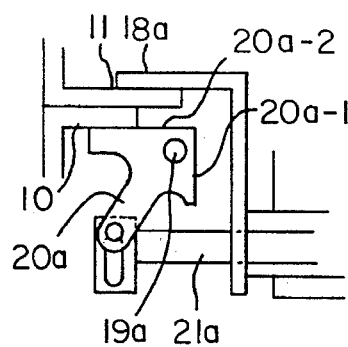
FIGS. 11(a) and 11(b) are views for illustrating a chucking pawl-operating mechanism.
Figure 11B:
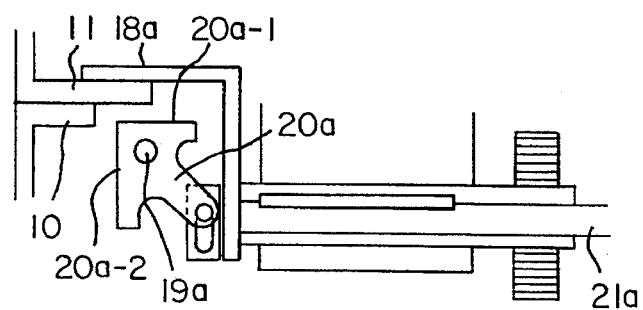

As shown in FIG. 6, a reciprocating beam 26 extends over the locations corresponding to the steps (4) to (8) above the heating oil vessel 25 filled with oil such as flowing paraffin, and the holding head 12 is adapted to be moved up and down relative to the reciprocating beam 26 via a bearing 27 and a rod 28 slidably fitted into the bearing 27 and to be moved along the reciprocating beam 26. The rod 28 is vertically moved by a cylinder 28 not shown. In FIG. 6, the holding head 12 is located in a right lower position in a zone where the the workpiece-setting vessel 7 and the pressing vessel member 8 between which the spent NaS cells are fixedly held are set and chucked in the holding head 12. FIG. 6(1) and FIG. 9 show the vertically inverted state in which the workpiece-setting vessel 7 is located downwardly. In this state, the spent NaS cells fixedly held between the workpiece-setting vessel 7 and the pressing vessel member 8 are immersed into the oil of the heating oil vessel 25, and the flange 10 of the workpiece-setting vessel 7 is placed on two rails 29 [See FIG. 6(2)]. Then, the push rods 21a, 21b are outwardly displaced to turn the chuck pawls 20a, 20b as shown in FIG. 10. Thereby, the chucked state of the flanges 10, 11 is released [See FIGS. 11(a) and 11(b)]. In FIG. 6, when the rod 28 is pulled up by the cylinder, the faces 20a-1, 20b-1 of the chuck pawls 20a, 20b butt the lower face of the flange 11 of the pressing vessel member 8 so that only the pressing vessel member 8 may be upwardly pulled up from the heating oil vessel 25. Thereafter, the pressing vessel member 8 is returned to the position in FIG. 6(1). The push rods 21a, 21b are inwardly pushed so that the chuck pawls 20a, 20b may be turned upwardly. Consequently, the faces 20a-2, 20b-2 of the chuck pawls 20a, 20b are pressed against the lower face of the flange 11 of the pressing vessel member 8, so that the pressing vessel member is chucked between the chuck pawls 18a, 20a and between 18b, 20b. Then, the pressing vessel member 8 is vertically inverted. Next, the pressing vessel member 8 is removed from the holding head 12, and returned to the position (2) by means of the conveyor in FIG. 1(5) for using it again.

As shown in FIG. 6 by imaginary lines, it may be that the reciprocal beam 26 itself is reciprocatingly movably fitted to a stationary beam so that the immersing unit (27, 28), the pusher (30), and the take-out unit (32) may be interlockingly operated.

The spent NaS cells 3 left on the horizontal rails 29 are heated by the heating flowing paraffin, so that the sodium inside the cells is melted and flows down into the bottom portion 25a of the heating oil vessel 25 through the cut openings and the inner tube pull-out holes 9 of the workpiece-setting vessel 7. At that time, since sodium does not almost contact air, it is not oxidized. Therefore, sodium smoothly flows out. After the cells are left at this position for a given time to completely remove the sodium, the workpiece-setting vessel 7 with the spent NaS cells 3 is moved to the location for pulling out the inner tubes 3b of the cells along the horizontal rails 29 by means of a pusher 30 which is hanged from the reciprocating beam 26 and moved up and down and to-and-fro along the reciprocating beam 26. Then, the inner tubes 3b are pulled out from the cells by an inner tube 3b pull-out device 31 at the inner tube 3b pull-out position [FIG. 6(3)].

Although the inner tube 3b pull-out device 31 is not illustrated in detail, an appropriate chuck-out device may be used for this purpose. That is, expandable chucking pull-out pawls are inserted into the spent NaS cell 3 through the inner tube 3b pull-out hole 9 of the workpiece-setting vessel 7 and the cut opening of the cell to chuck the inner tube 3b from the inner side. Then, the inner tube 3b is pulled out downwardly, whereas the outer tube 3a of the spent NaS cell 3 is held by the workpiece-setting vessel 7. The remaining, portions of the spent NaS cells 3 in which the inner tube 3b are pulled out in this matter are taken outside from the heating oil vessel 25 by means of a take-out head 32 which is hanged from the reciprocating beam 26 and moved up and down and to-and-fro along the reciprocating beam 26 [FIGS. 6(3) and (4)].

The thus pulled out workpiece-setting vessel 7 with the remaining spent NaS cells is placed on the conveyor [FIG. 1(8)]. After the outer cylinders of the spent NaS cells are removed from the workpiece-setting vessel 7 at the lifter table [FIG. 1(9)], the workpiece-setting vessel 7 is carried to the location in FIG. 1(3) for using it again.

In the embodiment in FIG. 2, the assembly of the workpiece-setting vessel 7, the pressing vessel member 8, and the spent NaS cells fixedly held therebetween is vertically inversed at the location of (4). In this embodiment, this assembly may be inversely inverted by a holding head, which is movable up and down relative to the reciprocating beam 26 but fixed in the longitudinal direction. In the embodiments in FIGS. 2 and 3, the workpiece-setting vessel 7 which is positioned near and outside the heating oil vessel 25 and into which the spent NaS cells are inserted can be moved up and immersed into the oil in the heating oil vessel 25 by using a transporting elevator movable along the reciprocating beam 26 and having no reversing mechanism.

In FIG. 6, it may be that a wheel truck is run along the reciprocating beam 26, and the cylinder hangs from the wheel truck. Three wheel trucks may be interlockingly operated.

What is claimed is:

1. A process for disposing of a spent NaS cell, comprising the steps of:

cutting the NaS cell to form at least one opening to expose an inner tube and sodium in the NaS cell;

flowing oil into the NaS cell through the at least one opening while the NaS cell is positioned upright, to cover the sodium with the oil;

inverting the NaS cell such that the at least one opening faces a downward direction, the NaS cell being supported by a workpiece setting vessel that provides access to permit removal of the inner tube through the at least one opening;

immersing the NaS cell supported by the workpiece setting vessel in heated oil provided in a heating oil vessel while the NaS cell is inverted, whereby the sodium in the NaS cell is melted and flows out of the NaS cell; and removing the inner tube from the NaS cell through the at least one opening.

2. The process of claim 1, wherein said at least one opening comprises a first opening formed in the NaS cell and a second opening formed in the inner tube, said first and second openings being formed by cutting.

3. The process of claim 1, wherein said NaS cell is placed between the workpiece setting vessel and a pressing vessel member, said workpiece setting vessel has a hole in communication with said at least one opening formed in the NaS cell, and the workpiece setting vessel and the pressing vessel member having the NaS cell supported therein are inverted such that the opening is directed downwardly.

4. The process of claim 2, wherein said NaS cell is placed between the workpiece setting vessel and a pressing vessel member, said workpiece setting vessel has a hole in communication with said first and second openings formed in the NaS cell, and the workpiece setting vessel and the pressing vessel member having the NaS cell supported therein are inverted such that the opening is directed downwardly.

5. The process of claim 3, wherein the pressing vessel member is removed after inversion.

6. The process of claim 4, wherein the pressing vessel member is removed after inversion.

7. The process of claim 3, wherein the pressing vessel member, the workpiece setting vessel and the NaS cell are inverted immediately before immersion such that the oil inside the inner tube flows therefrom.

8. The process of claim 4, wherein the pressing vessel member, the workpiece setting vessel and the NaS cell are inverted immediately before immersion such that the oil inside the inner tube flows therefrom.

9. The process of claim 1, wherein the at least one opening is formed by cutting the NaS cell in an opening-cutting oil vessel containing the oil, such that the oil flow into the NaS cell.

* * * * *